Figure 1B:
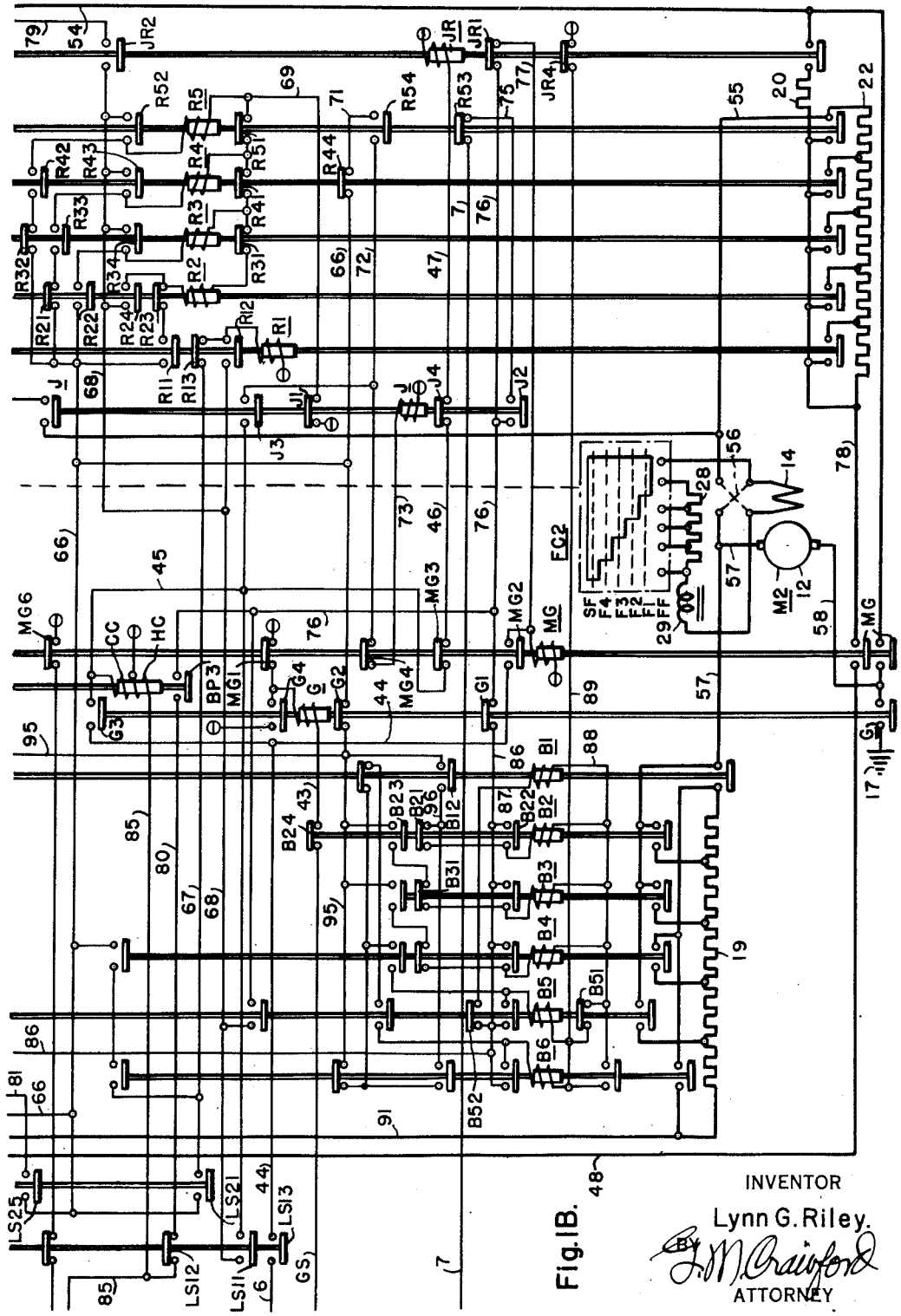

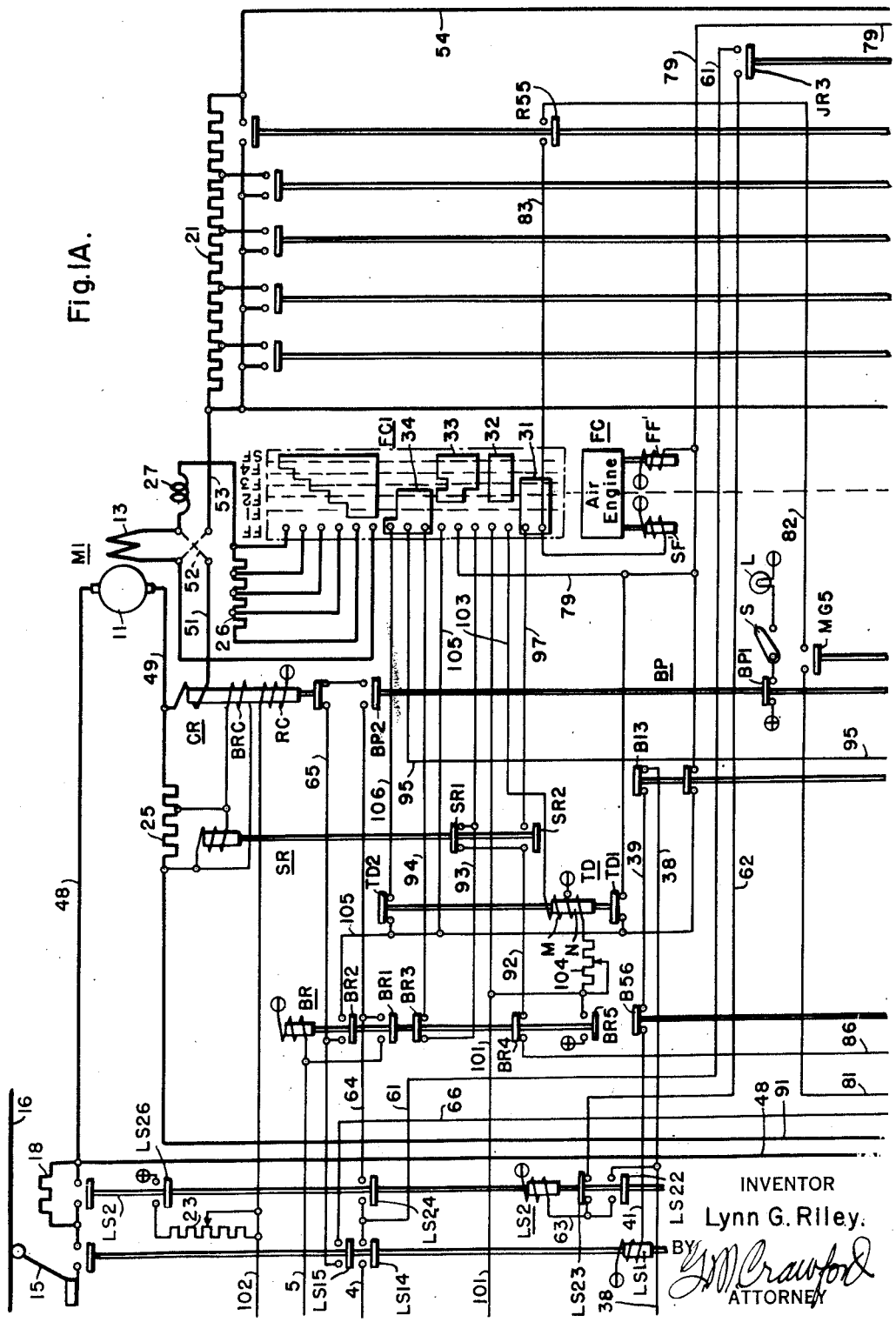

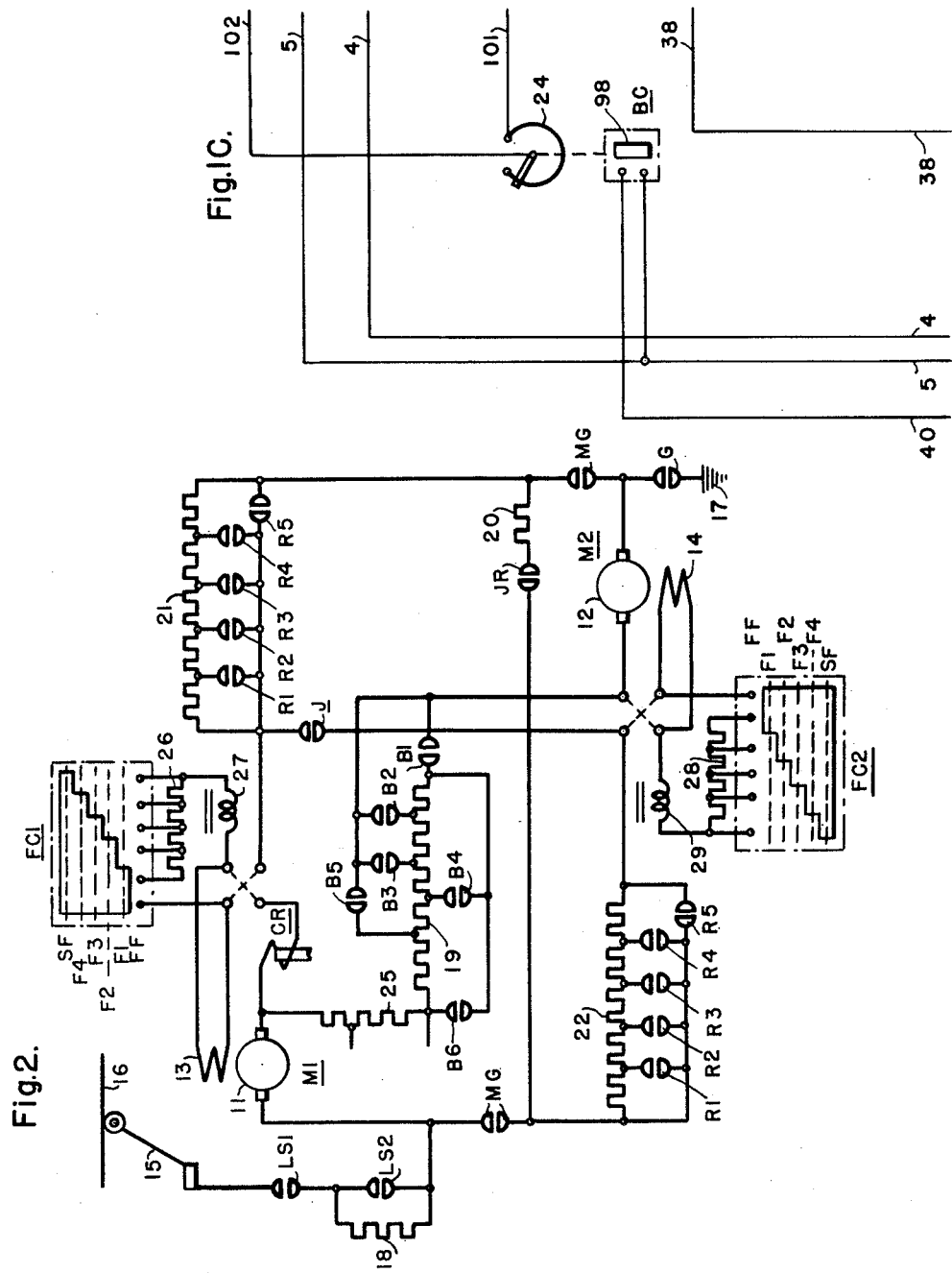

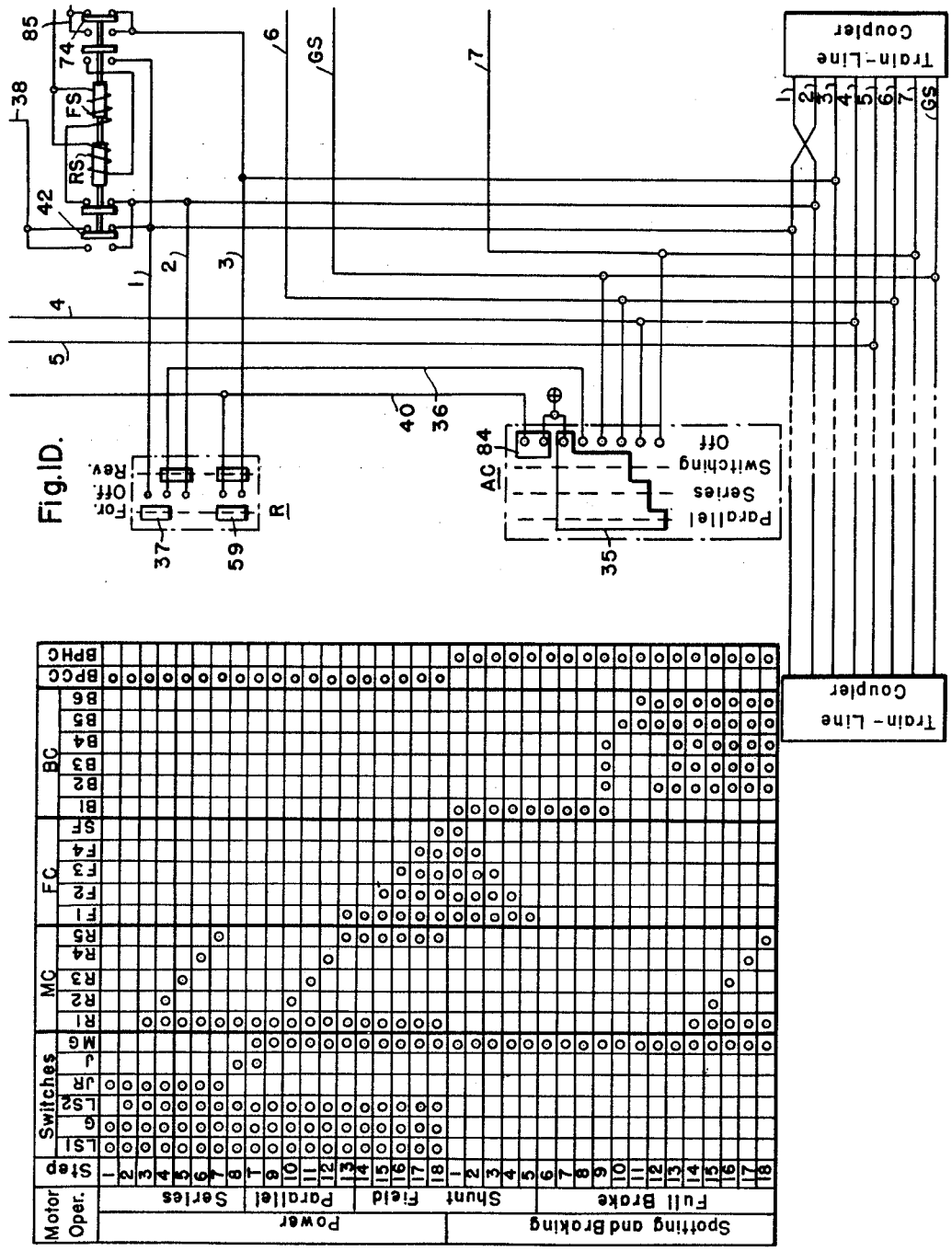

Patented May 20, 1952

2,597,183

UNITED STATES PATENT OFFICE 2,597,183

MOTOR CONTROL SYSTEM WITH DYNAMIC BRAKING

Lynn G. Riley, Pittsburgh, Pa., assignor to Westinghouse Electric Corporation, East Pittsburgh, Pa., a corporation of Pennsylvania Application May 28, 1949, Serial No. 95,904

15 Claims. (Cl. 318—255)

My invention relates, generally, to control systems, and, more particularly, to systems for controlling the operation of the propelling motors of electric vehicles, such as, for example, the system described in the copending application of L. G. Riley and G. R. Purifoy, Serial No. 28,618, filed May 22, 1948, patented September 19, 1950, No. 2,523,143.

It has been found that when the aforesaid system is utilized to control cars operated in multiple-unit trains, certain imperfections in car circuits, such as faulty coupler contacts for the train line wires, cause rapid chattering of some of the switch units under load. This results in arcing of the switch contact members and may continue until the unit is destroyed.

An object of my invention, generally stated, is to provide a motor control system which shall be simple and efficient in operation and which may be economically manufacture and installed.

A more specific object of my invention is to protect the apparatus of a control system against faults in train line wires which extend through the cars of a multiple-unit train.

Another object of my invention is to ensure the correct positioning of the motor reverser, line switch and interlocks on certain of the switches of the control system.

A further object of my invention is to ensure that the residual voltage of the motors will be of the correct polarity for dynamic braking.

Still another object of my invention is to provide an indication of any power or dynamic brake failure caused by fault conditions in train line or interlocking circuits.

Other objects of my invention will be explained fully hereinafter or will be apparent to those skilled in the art.

In accordance with my invention, a protective relay is so connected in a motor control system that it will permit a dynamic brake application only after a normal power application, thereby ensuring continuity of all main control circuits and correct polarity of residual motor voltage.

For a better understanding of the nature and objects of my invention, reference may be had to the following detailed description, taken in conjunction with the accompanying drawings, in which:

Figures 1A, 1B, 1C and 1D, when combined, constitute a diagrammatic view of a control system embodying the principal features of my invention;

Fig. 2 is a schematic diagram showing the main circuit connections for the motors and the control apparatus; and Fig. 3 is a chart showing the sequence of operation of part of the apparatus illustrated in Figs. 1 and 2.

Referring to the drawings, two motors M1 and M2 may be utilized for propelling an electric vehicle, such as, for example, a subway car (not shown). The motors are of the series type having armature windings 11 and 12 and series field windings 13 and 14, respectively. A line switch LS1 is provided for connecting the motors to a current collecting device 15 which engages a trolley conductor 16. A switch G is provided for connecting the motors to a ground connection 17, thereby completing the circuit to a source of power such as a power generating station (not shown).

As indicated in the sequence chart in Fig. 3, the motors M1 and M2 are first connected in series-circuit relation and then in parallel-circuit relation during acceleration of the vehicle. In addition to the switches LS1 and G, a switch JR is provided for connecting the motors in series-circuit relation. Bridging transition of the motors is obtained by means of a switch J which is closed during the transition period. The parallel-circuit connections are established through the switches LS1, G and a double pole switch MG. A switch LS2 is provided for shunting a resistor 18 from the motor circuit on the second notch or step of the accelerating cycle, as indicated in the sequence chart. The switch J shunts a resistor 20 from the motor circuit just prior to the transition from series to parallel operation.

The motors may also be connected for dynamic braking with the field winding 14 connected across the armature winding 11 and the field winding 13 connected across the armature winding 12, thereby permitting the current in the armature windings to reverse and cause the motors to act as generators and retard the vehicle. In addition to the switch MG, which is closed during dynamic braking, switches B1, B2, B3, B4, B5 and B6 are utilized to establish the dynamic braking circuits and to control the motor current by shunting a resistor 19 from the motor circuits during dynamic braking.

The motor current during both acceleration and dynamic braking is controlled by resistors 21 and 22. Double pole resistor shunting switches R1, R2, R3, R4 are provided for shunting the resistors 21 and 22 step-by-step. The resistor shunting switches operate in sequential relation, the sequence being controlled by interlock progression in a manner well known in the art.

The operation of the resistor shunting switches is automatically controlled by a current responsive relay CR having a series coil which is connected in the motor circuit during both acceleration and dynamic braking. In addition to the series coil, the relay CR is provided with a rate coil RC which is energized through an adjustable resistor 23 during acceleration and through a variable rheostat 24 during dynamic braking. If desired, the resistor 23 may be adjusted by a variable load mechanism in accordance with the load on the vehicle in a manner well known in the art.

As indicated in the drawings, the rheostat 24 may be adjusted by means of a braking controller BC which is operated during dynamic braking. If desired, the rheostat 24 may be adjusted in the manner described in Patent No. 2,318,330, issued May 4, 1943 to G. R. Purifoy, thereby coordinating the operation of the air-brake system and the dynamic braking of the vehicles. As described in the aforesaid patent, an air-operated device is provided on each vehicle of a train for actuating the rheostat on each vehicle. These devices are connected to the air line of the air-brake system and each device is, therefore, responsive to the air-brake pressure which, in turn, is controlled by the braking controller BC. In order to simplify the present drawings, the air line connections have been omitted.

The relay CR is also provided with a braking rate coil BRC which is connected across a portion of a resistor 25 which is connected in the motor circuit during dynamic braking. Thus, the calibration of the relay CR is changed during dynamic braking by the effect of the coil BRC.

An accelerating controller AC is provided for controlling the operation of the motor connecting switches during acceleration of the vehicle. The controller AC may be of the drum-type and, as shown, is provided with four positions, namely, "off," "switching," "series" and "parallel."

A reversing controller R is provided for controlling the direction of operation of the motors. The controller R controls the energization of reversing switch coils FS and RS which, in turn, control the operation of the reversers for the motors M1 and M2.

In order to permit the present system to be utilized on cars which are operated in multiple-unit trains and controlled from one control station at the head of the train, a braking relay BR is provided. The relay BR permits dynamic braking to be established simultaneously on all the cars of the train. The energization of the relay BR is controlled by the braking controller BC which, as explained hereinbefore, may also be operated to control the air-brake system which has not been shown. Thus, when the braking controller at the head of the train is operated, all of the relays BR throughout the train are energized to cause dynamic braking to be established on all the motors in the train.

As shown, the controllers AC and BC are connected to train line wires 1, 2, 3, 4, 5, 6, 7 and GS which extend throughout the train and are connected together between cars through train line couplers. The controllers AC and BC are electrically interlocked to prevent improper operation of the equipment.

Provision is made for shunting the series field windings of the motors during portions of the accelerating and the braking cycles by means of multiple step controllers FC1 and FC2. As shown, the controllers FC1 and FC2 may be actuated by an air engine FC which is provided with magnet valves SF' and FF' for controlling the fluid pressure in the air engine.

The shunt circuit for the field winding 13 comprises a resistor 26 and a reactor 27. As shown, the resistor 26 may be shunted step-by-step by means of the controller FC1. The shunt circuit for the series field winding 14 comprises a resistor 28 and a reactor 29. The resistor 28 may be shunted step-by-step by the controller FC2. As explained hereinbefore, the controllers FC1 and FC2 may be operated simultaneously by the air engine FC. The controller FC1 is provided with auxiliary contact segments 31, 32, 33 and 34, the function of which will be explained more fully hereinafter.

In the power-off or coasting position of the controller AC, the dynamic brake circuits are established and, at any speeds below a predetermined speed, the field shunt notching will progress at a low braking current under the control of a spotting relay SR. As shown, the actuating coil of the relay SR is connected across a portion of the resistor 25 which is in the dynamic braking circuit. Thus, the relay SR is responsive to the vehicle speed since the voltage drop across the resistor 25 varies with the current through the resistor which, in turn, is proportional to the vehicle speed. Therefore, the control equipment is positioned in accordance with the car speed and is prepared to respond promptly whenever a brake application is called for. The spotting relay controls the operation of the field shunting controller FC during the spotting operation.

While the basic spotting system affects only the position of the field shunt controller, spotting may take place on any of the series resistor notches depending on the shut-off speed and the length of the coasting period. In general, the spotting relay will select the proper notch, depending on the field strength required to get spotting current response. Two-way spotting of the field controller insures proper positioning of the equipment within a short time after closing the coasting circuits. Brake response is secured by building up field strength and by resistor notches depending on the braking rate desired. A time delay relay TD is provided for delaying the operation of the resistor shunting switches for a short time interval after full dynamic braking is called for in order to insure that the field strength of the motors has had time to build up.

In order to protect the equipment against faults in any of the basic train line wires, 1, 2, 3, 6 and GS, a relay BP is provided. The relay BP has a closing coil CC and a holding coil HC. The relay must be closed during power operation to set up the spotting and braking motor circuits and must stay closed throughout the entire braking cycle.

The closing coil CC is energized through train line wire 6 during power operation only after the line switch LS1 and the switch G have closed, thereby ensuring the continuity of the train line wires 1, 2, 6 and GS, as well as the correct positioning of the reverser, the line switch and the interlocking switches actuated by these switches. The holding coil HC, which is not powerful enough to actuate the relay, is energized through a continuation of the train line wire 3 beyond the interlocks on the reversing switches and holds the relay closed upon a power shutoff because of the overlap between the contact segments on the accelerating controller just ahead of the "off" position.

The contact members of the relay BP are so connected in the control circuit that a dynamic braking application can be obtained only after a normal power application, thus ensuring continuity of all control circuits and correct polarity of the residual motor voltage for building up a dynamic braking current. The relay BP is provided with normally closed contact members BP1 which control the energization of an indicator light L through a switch S, thereby indicating the failure of the equipment to respond to power or brake applications.

In order that the functioning of the foregoing apparatus may be more clearly understood, the operation of the system will now be described in more detail. Assuming that it is desired to accelerate the vehicle at the maximum rate, the controller AC is actuated to the "parallel" position, thereby obtaining automatic operation of the control equipment.

When the controller AC is on the "switching" position, the switches LS1, G and JR are closed to connect the motors M1 and M2 in series-circuit relation and in series with the resistors 18, 20, 21 and 22. The energizing circuit for the actuating coil of the switch LS1 may be traced from positive at the controller AC through a segment 35, conductor 36, a segment 37 on the reversing controller R, conductor 1, an interlock 42 on the reversing switch RS, conductor 38, interlock B13 on the switch B1, conductor 39, interlock B56 on the switch B5, conductor 41 and the actuating coil of the switch LS1 to negative. The energizing circuit for the actuating coil of the switch G extends from the controller segment 35 through conductor GS, an interlock B24, conductor 43, the actuating coil of the switch G and an interlock MG1 on the switch MG to negative. A holding circuit for the switch G is established through an interlock 64 on the switch G. Following the closing of the switches LS1 and G, the actuating coil of the switch JR is energized through a circuit which extends from the controller segment 35 through conductor 6, an interlock LS13, conductor 44, an interlock G3, conductor 45, an interlock MG3, conductor 46, an interlock J4, conductor 47 and the coil of the switch JR to negative.

At this time, the closing coil of the relay BP is energized through a circuit which extends from the previously energized conductor 45 through the closing coil CC to negative. It will be noted that it is necessary for the switches LS1 and G to be closed before the relay BP can close. Thus, the continuity of train line wires 1 or 2 and 6 and GS is ensured. Furthermore, the proper positioning of the reverser is ensured since the coil of the switch LS1 is energized through interlocks on the reversing switch.

The closing of the switches LS1, G and JR connects the motors in series-circuit relation through a circuit which extends from the trolley conductor 16 through the current collecting device 15, the switch LS1, the resistor 18, conductor 48, the armature winding 11 of the motor M1, conductor 49, the series coil of the relay CR, conductor 51, the reverser 52, the series field winding 13, the reverser 52, conductor 53, the resistor 21, conductor 54, the switch JR, the resistors 20 and 22, conductor 55, the reverser 56, the field winding 14, the reverser 56, conductor 57, the armature winding 12, conductor 58, and the switch G to ground at 17.

When the controller AC is on the "series" position, the switch LS2 is closed to shunt the resistor 18 from the motor circuit. The energizing circuit for the actuating coil of the switch LS2 may be traced from the controller segment 35 through conductor 4, and interlock LS14, conductor 61, an interlock JR3, conductor 62, an interlock LS23, conductor 63, and the coil of the switch LS2 to negative. A holding circuit for the coil of the switch LS2 is established from the conductor 38 through an interlock LS22 when the switch is closed.

Following the closing of the switch LS2, the resistor shunting switches R1, R2, R3, R4 and R5 are closed in sequential relation under the control of the limit relay CR. The energizing circuit for the actuating coil of the switch R1 extends from the conductor 61 through an interlock LS24, conductor 64, contact members BP2 of the relay BP and the contact members of the relay CR, conductor 65, an interlock LS15, conductor 66, an interlock LS21, conductor 67, an interlock R13, and the actuating coil of the switch R1 to negative. A holding circuit is established from the conductor 45 through an interlock LS11, conductor 68, and an interlock R12 when the switch is closed.

As explained hereinbefore, the switches R2, R3, R4 and R5 are closed by interlock progression under the control of the limit relay CR. The energizing circuit for the actuating coil of the switch R2 extends from the conductor 66 through interlocks R11 and R23, the coil of the switch R2, interlocks R31, R41 and R51, conductor 69 and an interlock J1 to negative. A holding circuit for the switch R2 is established from the conductor 68 through an interlock R24 on the switch R2.

Following the closing of the switch R2, the actuating coil of the switch R3 is energized through a circuit which extends from the conductor 66 through an interlock R22, the coil of the switch R3, the interlocks R41 and R51, the conductor 69 and the interlock J1 to negative. A holding circuit for the switch R3 is established through an interlock R34.

The actuating coil of the switch R4 is energized through a circuit which extends from the conductor 66 through interlocks R21 and R33, the coil of the switch R4, interlock R51, conductor 69 and the interlock J1 to negative. A holding circuit for the switch R4 is established through an interlock R43.

The actuating coil of the switch R5 is energized from the conductor 66 through interlocks R32 and R42, the coil of the switch R5, conductor 69 and the interlock J1 to negative. It will be noted that the closing of the switch R5 opens the interlock R51, thereby causing the switch R4 to open. The switch R3 was opened following the closing of the switch R4 and the switch R2 was opened following the closing of the switch R3 by the opening of the interlocks on the proper switches. A holding circuit for the switch R5 is established through an interlock R52 when the switch is closed.

Following the closing of the switch R5, the switch J is closed during bridging transition of the motors from series-circuit relation to parallel-circuit relation. The energizing circuit for the actuating coil for the switch J extends from the conductor 66 through an interlock R44, conductor 71, an interlock R54, conductor 72, an interlock MG4, conductor 73, and the coil of the switch J to negative. A holding circuit for the switch J extends from the conductor 45 through an interlock J3, conductor 72, the interlock MG4, conductor 73, and the coil of the switch J to negative. The closing of the switch J causes the opening of the switch JR by interrupting the energizing circuit for the coil of the switch JR which was previously established through an interlock J4 on the switch J. As explained hereinbefore, the switch J shunts the resistor 20 from the motor circuit.

At this time, the switch MG is closed to complete the parallel connections for the motors M1 and M2. The energizing circuit for the actuating coil of the switch MG may be traced from positive through the controller segment 35, conductor 7, an interlock R53, conductor 75, an interlock J2, conductor 76, an interlock JR1, conductor 77, and the coil of the switch MG to negative. A holding circuit is established from the conductor 44 through an interlock MG2 to the coil of the switch MG. The closing of the switch MG causes the opening of the switch J by interrupting the holding circuit through the interlock MG4.

The motors M1 and M2 are now connected in parallel-circuit relation. The circuit through the motor M1 extends from the conductor 48 through the armature winding 11, conductor 49, the series coil of the relay CR, conductor 51, the reverser 52, field winding 13, the reverser 52, conductor 53, the resistor 21, conductor 54, the switch MG, conductor 58 and the switch G to ground at 17. The circuit for the motor M2 extends from the conductor 43 through the switch MG, conductor 78, the resistor 22, conductor 55, the reverser 56, the field winding 14, the reverser 56, armature winding 12, conductor 58 and the switch G to ground.

The acceleration of the motors is continued by the closing of the switches R2, R3, R4 and R5 to shunt the resistors 21 and 22 from the motor circuit. The resistor shunting switches are operated in sequential relation under the control of the relay CR in the manner previously described.

Following the closing of the switch R5, the actuating coil of the magnet valve SF' is energized to actuate the field shunting controllers FC1 and FC2 from the full field position to the short field position, thereby shunting the motor field to increase the speed of the motor. During series operation of the motors, the magnet valve FF' was energized through a circuit extending from the conductor 68 through an interlock JR2, conductor 79, and the coil of the magnet valve FF' to negative. The energizing circuit for the coil of the magnet valve SF' extends from the conductor 66 through an interlock LS25, conductor 81, an interlock MG5, conductor 82, an interlock R55, conductor 83 and the coil of the magnet valve SF' to negative.

As indicated by the sequence chart, the field controllers are operated step-by-step, first to establish field shunting circuits for field windings 13 and 14 when on position F1 and then to shunt the resistors 26 and 28 from the field shunting circuits, thereby decreasing the field strength of the motors and causing the speed of the motors to increase in a manner well known in the art. When the field shunting controls are on the short field position, the accelerating cycle is completed.

If it is desired to permit the vehicle to coast, the controller AC is actuated to the "off" position, thereby causing the opening of the switches LS1, LS2 and G to disconnect the motors from the power source. As explained hereinbefore, the holding coil HC of the relay BP is energized as the controller AC is being actuated toward the "off" position. The energizing circuit for the coil HC may be traced from positive through a segment 84 on the controller AC, conductor 40, a segment 59 on the controller R, conductor 3, an interlock 74 on the reversing switch FS, conductor 85 and the holding coil HC negative. In this manner, the relay BP is held closed during the coasting and braking cycles provided the train line circuits function properly.

Following the opening of the switches, LS1 and G, the switch B1 is closed to establish a dynamic braking circuit for the motors. The energizing circuit for the actuating coil of the switch B1 may be traced from the conductor 85 through an interlock LS12, conductor 80, contact members BP3, conductor 76, an interlock G1, conductor 86, an interlock B52, conductor 87, the actuating coil of the switch B1, conductor 88, an interlock B51, conductor 89, and an interlock JR4 to negative.

At this time, the motors are connected for dynamic braking with the resistors 19, 21 and 22 connected in the dynamic braking circuits and with the field controllers FC1 and FC2 on the short field position to shunt the motor field windings. Since the motors are operating with a weak field strength and the maximum amount of external resistance is connected in the dynamic braking circuits, a relatively small amount of braking current circulates through the motors. However, this current is enough to give sufficient braking action to prevent the vehicle from attaining an excessive speed during coasting.

The dynamic braking circuit for the motor M1 extends from one terminal of the armature winding 11 through conductor 48, the switch MG, conductor 78, the resistor 22, conductor 55, the reverser 56, the field winding 14 of the motor M2, the reverser 56, conductor 57, the switch B1, the resistor 19, conductor 91, the resistor 25 and conductor 49 to the other terminal of the armature winding 11. The circuit for the motor M2 extends from one terminal of the armature winding 12 through conductor 57, the switch B1, the resistor 19, conductor 91, the resistor 25, conductor 49, the series winding of the relay CR, conductor 51, the reverser 52, the field winding 13 of the motor M1, the reverser 52, conductor 53, the resistor 21, conductor 54, the switch MG and conductor 58 to the other terminal of the armature winding 12.

During coasting of the vehicle, the operation of the field shunting controllers FC1 and FC2 and the resistor shunting switches is under the control of the spotting relay SR which, as explained hereinbefore, is responsive to the motor speed. In this manner, the control apparatus is positioned in accordance with the car speed and is prepared to respond promptly whenever a brake application is called for.

As explained hereinbefore, the field shunting controllers FC1 and FC2 were actuated to the short field position during acceleration of the motors. They remain in this position during coasting until the braking current decreases sufficiently to permit the spotting relay SR to drop to its lowermost position.

When the relay SR is in its lowermost position, an energizing circuit is established for the coil of the magnet valve FF', thereby causing the field controllers FC1 and FC2 to be actuated from the short field position toward the full field position. The energizing circuit for the coil of the magnet valve FF' may be traced from the previously energized conductor 86 through contact members BR4 of the relay BR, conductor 92, contact members SR1 of the relay SR, conductor 93, contact segment 33 of the controller FC1, conductor 79 and the coil FF' to negative.

In this manner the field controller is actuated toward the full field position under the control of the spotting relay SR. When the field controller reaches the "F2" position, the switch B2 is closed to shunt a portion of the resistor 19 from the motor circuits. The energizing circuit for the actuating coil of the switch B2 may be traced from the conductor 93 through contact members BR3 of the relay BR, conductor 94, contact segment 34 of the controller FC1, conductor 95, an interlock B12, conductor 96, an interlock B21, the actuating coil of the switch B2, conductor 88, the interlock B51, conductor 89, and the interlock JR4 to negative. A holding circuit is established from the conductor 86 through an interlock B22 when the switch B2 is closed.

The shunting of a portion of the resistor 19 from the motor circuits will, of course, cause the motor current to increase, thereby actuating the relay SR to its uppermost position. When the relay SR is in its uppermost position, an energizing circuit is established for the coil of the magnet valve SF', thereby causing the field controllers FC1 and FC2 to be operated toward the short field position. The circuit for the coil SF' extends from the conductor 92 through contact members SR2, conductor 97, the contact segment 31 and conductor 83 through the coil SF' to negative.

The field controller is stopped on position "F4" by the interrupting of the circuit through the contact segment 31 and remains on this position until the motor current decreases sufficiently to permit the relay SR to drop to its lowermost position. When the relay drops to its lowermost position, the energizing circuit for the coil of the magnet valve FF' is reestablished, thereby causing the field controller to be actuated toward the full field position.

When the field controller reaches position "F2," the switch B3 is closed to shunt another portion of the resistor 19 from the motor circuits. The energizing circuit for the actuating coil of the switch B3 extends from the conductor 95 through interlocks B23 and B31 to the coil of the switch B3 and thence through conductor 88, the interlock B51, conductor 89 and the interlock JR4 to negative.

In this manner, the resistor shunting switches are "spotted" during coasting by the operation of the field controller which, in turn, is under the control of the spotting relay SR. The switches B4, B5 and B6 may be closed by interlock progression under the control of the spotting relay in a similar manner. If the vehicle speed continues to decrease during coasting, the switches R1 to R5 will be closed under the control of the spotting relay, thereby continuing to shunt resistance from the motor circuit in accordance with the vehicle speed.

If it is desired to decelerate the vehicle by dynamic braking, the controller BC is actuated to establish an energizing circuit for the actuating coil of the relay BR. This circuit extends from the conductor 40 through a segment 98 on the controller BC, conductor 5 and the coil of the relay BR to negative.

When the relay BR is actuated to its uppermost position, the contact members BR3 and BR4 are opened and a contact member BR1 is closed, thereby transferring the control of the resistor shunting switches and the field shunting controller from the spotting relay SR to the current responsive relay CR. At this time a contact member BR5 is also closed to energize the rate coil RC on the relay CR through a circuit which extends from positive through the contact member BR5, a conductor 101, the rheostat 24, conductor 102 and the coil RC to negative.

It will be noted that the circuit through the variable resistor 23 was interrupted by the opening of an interlock LS26 when the switch LS2 was opened at the beginning of the coasting operation. As explained hereinbefore, the rheostat 24 is adjusted in accordance with the position of the controller BC, thereby governing the dynamic braking rate by changing the calibration of the relay CR.

The closing of the contact member BR5 on the relay BR also energizes both the magnetizing coil M and the neutralizing coil N of the time delay relay TD, thereby actuating this relay to its uppermost position. The energizing circuit for the magnetizing coil extends from the conductor 101 through the segment 32 on the controller FC1, conductor 103 and the coil M to negative. The circuit for the neutralizing coil N extends from the conductor 101 through a resistor 104 and the coil N to negative.

At this time, the field shunting controller is actuated toward the full field position to increase the field strength of the motors, thereby building up the dynamic braking effect. The energizing circuit for the coil of the magnet valve FF' extends from the conductor 65 through a contact member BR2 of the relay BR, conductor 105, the segment 33 on the controller FC1, conductor 79, and the coil FF' to negative. When the field shunting controller is on position "F1," the circuit through the segment 33 is interrupted, thereby stopping the field shunting controller on position "F1". At this time, the circuit through the segment 32 for the magnetizing coil M of the time delay relay TD is also interrupted. The field shunting controller is held on position "F1" for a short time interval while the neutralizing coil N of the time delay relay demagnetizes the relay sufficiently to permit it to drop to its lowermost posiiton. The delay in the operation of the field shunting controller is to insure that the field strength of the motors has time to build up before the operation of the resistor shunting switches is begun.

When the contact member TD1 on the relay TD is closed, within a short time after the deenergization of the magnetizing coil M, the coil of the magnet valve FF' is energized through a circuit which extends from the conductor 105 through the contact member TD1, conductor 79 and the coil FF' to negative. The field shunting controller is then actuated to the full field position.

When the field shunting controller is on position "FF," the progression wire 95 for the resistor shunting switches B2 to B6 is energized through a circuit which extends from the conductor 105 through contact members TD2, conductor 106 and the segment 34 on the controller FC1. The energization of the progression wire 95 causes the switches B2 to B6 to be operated in the order shown in the sequence chart in Fig. 3 to complete the shunting of the resistor 19 from the motor circuits.

It will be understood that the sequential operation of the resistor shunting switches starts from the last switch which was closed during the coasting operation under the control of the spotting relay. Thus, the amount of resistance in the motor circuit has been proportioned according to the vehicle's speed and a smooth dynamic braking effect is obtained without delay when the full dynamic brake is applied.

When the switches have been closed to complete the shunting of the resistor 19 from the motor circuit under the control of the relay CR, the switches R1 to R5 are closed in the order shown in the sequence chart in Fig. 3 to shunt the resistors 21 and 22 from the motor circuit. The progression wire 66 for the switches R1 to R5 is energized through an interlock G2 on the switch G. The resistor shunting switches are operated by interlock progression under the control of the relay CR in the manner hereinbefore described.

When the switches are closed to shunt the resistors 21 and 22 from the motor circuit, the dynamic braking cycle is completed and the vehicle may be brought to a standstill by means of the air-brake system. As described in United States Patent 2,345,150, issued March 28, 1944 to G. R. Purifoy, the dynamic braking and the air-brake system may be so coordinated that the air-brake system takes effect as the dynamic braking system fades out, thereby continuing the deceleration of the vehicle in a smooth manner.

The sequential operation of the switches B1 to B6 by interlock progression has not been described in detail since it is similar in principle to the operation of the switches R1 to R5 which has been described in detail. The interlocks on the switches and the circuits which control their operation are shown in the diagram and the switches are operated in the order shown in the sequence chart in Fig. 3. Other protective interlocks shown in the diagram have not been described in detail since their function and method of operation are well known in the railway control art.

From the foregoing description, it is apparent that I have provided a control system which will permit a dynamic brake application only after a normal power application, thereby insuring continuity of the control circuits, particularly the train line wires in a multiple-unit train, proper operation of the protective interlocking and correct polarity of residual motor voltage. The present system also provides for indicating failures of the equipment to function properly.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system, in combination, a motor, main power conductors, control power conductors, switching means for connecting the motor to the main power conductors, additional switching means for establishing dynamic braking connections for the motor, manually operable control means for controlling the operation of said first-named switching means, relay means having contact members cooperating with said control means in controlling the operation of said additional switching means, said relay means having a closing coil and a holding coil, interlocking contact means actuated by said first-named switching means and cooperating with said control means to control the energization of said closing coil through said control power conductors, and contact means on said control means for controlling the energization of said holding coil.

2. In a control system, in combination, a motor, main power conductors, control power conductors, switching means for connecting the motor to the main power conductors, additional switching means for establishing dynamic braking connections for the motor, manually operable control means for controlling the operation of said first-named switching means, relay means having contact members cooperating with said control means in controlling the operation of said additional switching means, said relay means having a closing coil and a holding coil, interlocking contact means actuated by said first-named switching means and cooperating with said control means to control the energization of said closing coil through said control power conductors, and contact means on said control means for controlling the energization of said holding coil, said closing coil being energized only when said control means is actuated to apply power to the motor.

3. In a control system, in combination, a motor, main power conductors, control power conductors, switching means for connecting the motor to the main power conductors, additional switching means for establishing dynamic braking connections for the motor, manually operable control means for controlling the operation of said first-named switching means, relay means having contact members cooperating with said control means in controlling the operation of said additional switching means, said relay means having a closing coil and a holding coil, interlocking contact means actuated by said first-named switching means and cooperating with said control means to control the energization of said closing coil through said control power conductors, and contact means on said control means for controlling the energization of said holding coil, said closing coil being energized only when said control means is actuated to apply power to the motor, said holding coil being energized prior to the deenergization of said closing coil by the actuation of said control means to establish dynamic braking connections for the motor.

4. In a control system, in combination, a motor, main power conductors, control power conductors, switching means for connecting the motor to the main power conductors, additional switching means for establishing dynamic braking connections for the motor, resistance means for controlling the motor current, a plurality of switches for shunting said resistance means step-by-step, a relay responsive to the motor current, relay means having contact members for controlling the operation of said additional switching means, said relay means cooperating with said relay in controlling the operation of said switches, and interlocking contact means actuated by said first-named switching means for controlling the energization of said relay means through said control power conductors.

5. In a control system, in combination, a motor, main power conductors, control power conductors, switching means for connecting the motor to the main power conductors, additional switching means for establishing dynamic braking connections for the motor, manually operable control means for controlling the operation of said first-named switching means, relay means having contact members cooperating with said control means in controlling the operation of said additional switching means, resistance means for controlling the motor current, a plurality of switches for shunting said resistance means step-by-step, a relay responsive to the motor current and cooperating with said relay means in controlling the operation of said switches, and interlocking contact means actuated by said first-named switching means for controlling the energization of said relay means through said control power conductors.

6. In a control system, in combination, a motor, main power conductors, control power conductors, switching means for connecting the motor to the main power conductors, additional switching means for establishing dynamic braking connections for the motor, manually operable control means for controlling the operation of said first-named switching means, relay means having contact members cooperating with said control means in controlling the operation of said additional switching means, resistance means for controlling the motor current, a plurality of switches for shunting said resistance means step-by-step, a relay responsive to the motor current and cooperating with said relay means in controlling the operation of said switches, and interlocking contact means actuated by said first-named switching means and cooperating with said control means in controlling the energization of said relay means through said control power conductors.

7. In a control system, in combination, a motor, power conductors, switching means for connecting the motor to the power conductors, additional switching means for establishing dynamic braking connections for the motor, a plurality of train line wires, manually operable control means for controlling the operation of said first-named switching means through said wires, relay means having contact members cooperating with said control means in controlling the operation of said additional switching means, and interlocking contact means actuated by said first-named switching means for controlling the energization of said relay means.

8. In a control system, in combination, a motor, power conductors, switching means for connecting the motor to the power conductors, additional switching means for establishing dynamic braking connections for the motor, a plurality of train line wires, manually operable control means for controlling the operation of said first-named switching means through said wires, relay means having contact members cooperating with said control means through said wires in controlling the operation of said additional switching means, and interlocking contact means actuated by said first-named switching means and cooperating with said control means through said wires in controlling the energization of said relay means.

9. In a control system, in combination, a motor, power conductors, switching means for connecting the motor to the power conductors, additional switching means for establishing dynamic braking connections for the motor, reversing means for the motor, manually operable control means, interlocking contact means actuated by the reversing means and cooperating with the control means in controlling the operation of said first-named switching means, relay means having contact members for controlling the operation of said additional switching means, and interlocking contact means actuated by said first-named switching means for controlling the energization of said relay means.

10. In a control system, in combination, a motor, power conductors, switching means for connecting the motor to the power conductors, additional switching means for establishing dynamic braking connections for the motor, reversing means for the motor, manually operable control means, interlocking contact means actuated by the reversing means and cooperating with the control means in controlling the operation of said first-named switching means, relay means having contact members cooperating with said control means in controlling the operation of said additional switching means, and interlocking contact means actuated by said first-named switching means and cooperating with said control means in controlling the energization of said relay means.

11. In a control system, in combination, a motor, power conductors, switching means for connecting the motor to the power conductors, additional switching means for establishing dynamic braking connections for the motor, relay means having contact members for controlling the operation of said additional switching means, interlocking contact means actuated by said first-named switching means for controlling the energization of said relay means, and indicating means energized through said relay means.

12. In a control system, in combination, a motor, power conductors, switching means for connecting the motor to the power conductors, additional switching means for establishing dynamic braking connections for the motor, relay means having normally open contact members for controlling the operation of said additional switching means, interlocking contact means actuated by said first-named switching means for controlling the energization of said relay means, normally closed contact members on said relay means, and indicating means energized through said normally closed contact members.

13. A motor-controlling assembly, including the combination, with a motor-means to be controlled, of a supply-circuit for the motor-means; power-switch means for establishing a power-circuit for energizing the motor-means from the supply-circuit; braking-switch means for establishing a dynamic-braking circuit for the motor-means; an accelerating-controller having an off-position and an on-position or positions; a motoring-circuit on-position controller-contact means, which is closed when said accelerating-controller is moved from its off-position; control-circuit means for effecting a closure of said power-switch means so as to establish a power-circuit for the motor-means in joint response to an open position of a braking-switch means, and to an on-position of said accelerating-controller, including a response to said motoring-circuit on-position controller-contact means; a braking-circuit off-position controller-contact means, which is closed when said accelerating-controller is in its off-position, there being an overlapping point when both said motoring-circuit and braking-circuit controller-contact means are closed; a protective relay; control-circuit means for effecting an actuation of said protective relay in response to the establishment of a power-circuit for said motor-means; holding-means for holding said protective relay in its actuated position in response to a closure of said braking-circuit off-position controller-contact means, said holding-means being effective only after said protective relay has previously been moved to its actuated position; and control-circuit means for effecting a closure of said braking-switch means so as to establish a dynamic-braking motor-circuit in joint response to an off-position of said accelerating-controller, to an open position of a power-switch means, and to an actuated position of said protective relay.

14. A motor-controlling assembly, including the combination, with a motor-means to be controlled, of a supply-circuit for the motor-means; power-switch means for establishing a power-circuit for energizing the motor-means from the supply-circuit; braking-switch means for establishing a dynamic-braking circuit for the motor-means; progressively operating current-controlling means for controlling the motor-current; progressively operating braking-controlling means for controlling dynamic-braking motor-conditions; a limit-relay or relays energized to be responsive to conditions which accompany excessive torque in the motor-means; an accelerating-controller having an off-position and an on-position or positions; a braking-controller having an off-position and an on-position or positions; a motoring-circuit on-position controller-contact means, which is closed when said accelerating-controller is moved from its off-position; control-circuit means for effecting a closure of said power-switch means so as to establish a power-circuit for the motor-means in joint response to an open position of a braking-switch means, and to an on-position of said accelerating-controller, including a response to said motoring-circuit on-position controller-contact means; a braking-circuit off-position controller-contact means, which is closed when said accelerating-controller is in its off-position, there being an overlapping point when both said motoring-circuit and braking-circuit controller-contact means are closed; a protective relay; control-circuit means for effecting an actuation of said protective relay in response to the establishment of a power-circuit for said motor-means; holding-means for holding said protective relay in its actuated positon in response to a closure of said braking-circuit off-position controller-contact means, said holding-means being effective only after said protective relay has previously been moved to its actuated position; control-circuit means for causing a progressing operation of said progressively operating current-controlling means in joint response to an on-position of said accelerating-controller and to the position of a limit-relay; control-circuit means for effecting a closure of said braking-switch means so as to establish a relatively weak dynamic-braking motor-circuit in joint response to an off-position of said accelerating-controller, to an open position of a power-switch means, and to an actuated position of said protective relay; and control-circuit means for causing a progressing operation of said progressively operating braking-controlling means in joint response to an on-position of said braking-controller, to an actuated position of said protective relay, and to the position of a limit-relay.

15. A motor-controlling assembly, including the combination, with a motor-means to be controlled, of a supply-circuit for the motor-means; power-switch means for establishing a power-circuit for energizing the motor-means from the supply-circuit; braking switch means for establishing a dynamic-braking circuit for the motor-means; progressively operating current-controlling means for controlling the motor-current; progressively operating braking-controlling means for controlling dynamic-braking motor-conditions; a limit-relay or relays energized to be responsive to conditions which accompany excessive torque in the motor-means; an accelerating-controller having an off-position and an on-position or positions; a braking-controller having an off-position and an on-position or positions; a motoring-circuit on-position controller-contact means, which is closed when said accelerating-controller is moved from its off-position; control-circuit means for effecting a closure of said power-switch means so as to establish a power-circuit for the motor-means in joint response to an open position of a braking-switch means, and to an on-position of said accelerating-controller, including a response to said motoring-circuit on-position controller-contact means; a braking-circuit off-position controller-contact means, which is closed when said accelerating-controller is in its off-position, there being an overlapping point when both said motoring-circuit and braking-circuit controller-contact means are closed; a protective relay; control-circuit means for effecting an actuation of said protective relay in response to the establishment of a power-circuit for said motor-means; holding-means for holding said protective relay in its actuated position in response to a closure of said braking-circuit off-position controller-contact means, said holding-means being effective only after said protective relay has previously been moved to its actuated position; control-circuit means for causing a progressing operation of said progressively operating current-controlling means in joint response to an on-position of said accelerating-controller, to an actuated position of said protective relay, and to the position of a limit-relay; control-circuit means for effecting a closure of said braking-switch means so as to establish a relatively weak dynamic-braking motor-circuit in joint response to an off-position of said accelerating-controller, to an open position of a power-switch means, and to an actuated position of said protective relay; and control-circuit means for causing a progressing operation of said progressively operating braking-controlling means in joint response to an on-position of said braking-controller, to an actuated posiiton of said protective relay, and to the position of a limit-relay.

LYNN G. RILEY.

REFERENCES CITED

The following references are of record in the file of this patent:

UNITED STATES PATENTS

| Number | Name | Date |
|---|---|---|
| 2,134,545 | Austin | Oct. 25, 1938 |
| 2,331,228 | Purifoy | Oct. 5, 1943 |